United States Patent [19]

Wolfe

[11] 3,964,329

[45] June 22, 1976

[54] ENDLESS POWER TRANSMISSION BELT

[75] Inventor: Jerry D. Wolfe, Springfield, Mo.

[73] Assignee: Dayco Corporation, Dayton, Ohio

[22] Filed: Sept. 24, 1975

[21] Appl. No.: 616,335

[52] U.S. Cl. ................................... 74/233; 74/234
[51] Int. Cl.² ...................... F16G 5/16; F16G 5/00
[58] Field of Search ............... 74/231 R, 233, 234, 74/237; 156/139, 140

[56] References Cited
UNITED STATES PATENTS

| | | | |
|---|---|---|---|
| 2,554,917 | 5/1951 | Moon | 74/233 |
| 3,164,026 | 1/1965 | Terhune | 74/233 |
| 3,566,706 | 3/1971 | Fix | 74/233 |
| 3,800,610 | 4/1974 | Wach | 74/233 |

*Primary Examiner*—Leonard H. Gerin
*Attorney, Agent, or Firm*—Reuben Wolk

[57] ABSTRACT

An endless power transmission belt of trapezoidal cross section and made primarily of elastomeric material is provided and has a corrosion resistant cover made solely of elastomeric material. The cover when viewed in cross-section is defined by a U-shaped portion having a bight and a pair of legs extending from opposite ends of the bight with the legs terminating in outer ends and a strip disposed between the outer ends. The U-shaped portion and strip are defined as a unitary elastomeric mass which serves to isolate and shield the entire belt.

22 Claims, 4 Drawing Figures

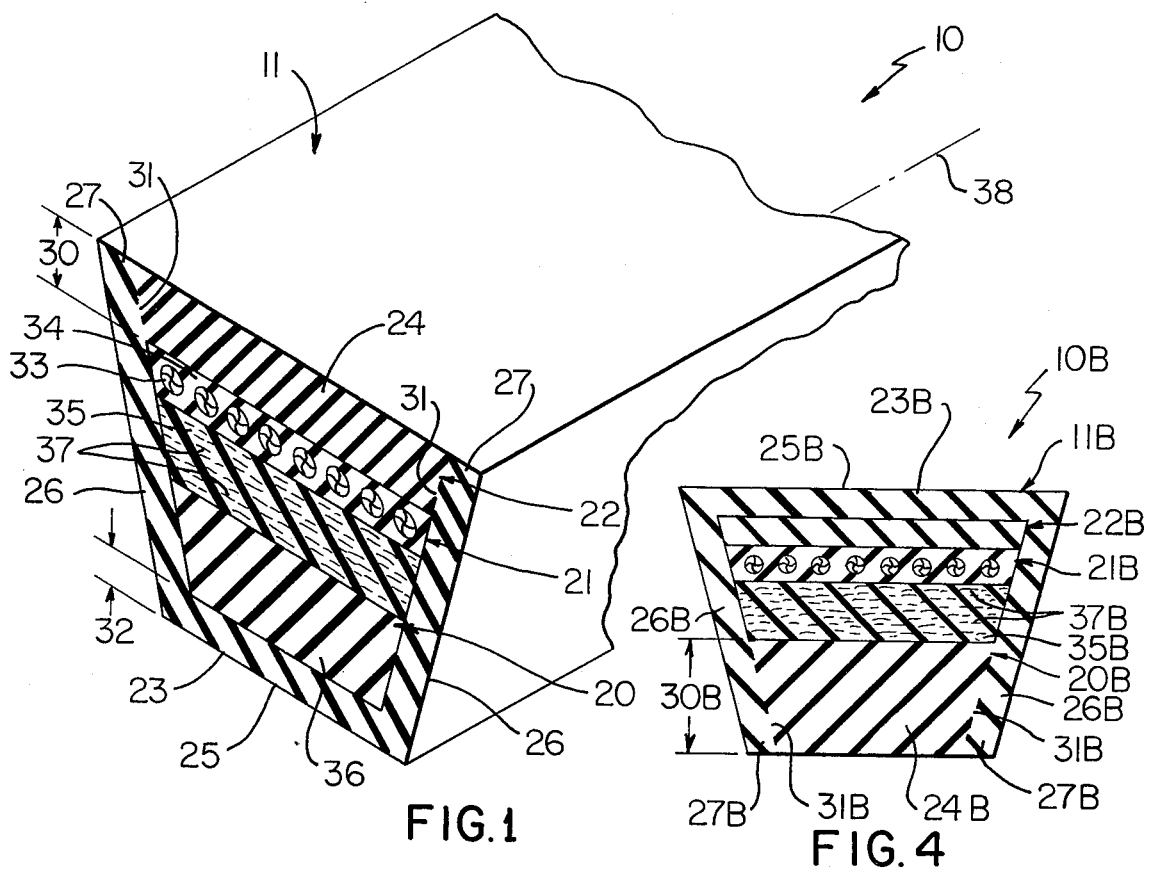
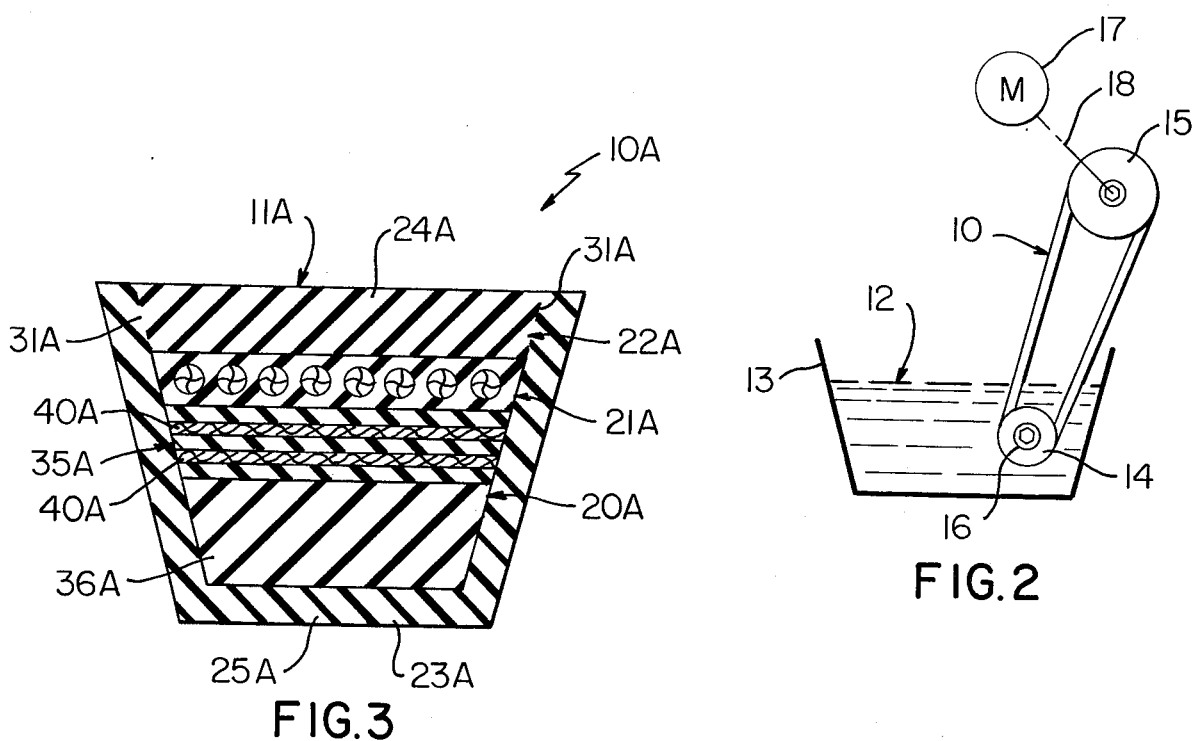

ENDLESS POWER TRANSMISSION BELT

BACKGROUND OF THE INVENTION

Endless power transmission belts, or so-called V-belts, are widely used throughout industry; and, in many applications such belts are subject to corrosive attack due to their operating environment. For example, in the metal plating industry it is necessary to clean metal articles thoroughly prior to plating thereof with the desired finish and such cleaning is often achieved by placing the metal articles in an acidic or alkaline cleaning liquid which is agitated to provide the cleaning action in a more efficient manner.

In many applications the cleaning liquid is agitated with a suitable agitator which is driven by an elastomeric V-belt. However, most V-belts employ materials in their various component portions which are readily corroded and damaged by the cleaning liquid whereby a serious problem in using V-belts in a cleaning liquid environment is to assure that each belt is provided with a cover which is resistant to corrosive attack by such liquid.

It is known in the art to provide a V-belt having a cover surrounding the main body thereof and as shown in U.S. Pat. No. 3,800,611, for example. However, most belts proposed heretofore are comprised of component materials (such as exposed ends of woven fabric) which are readily attacked and destroyed by a corrosive fluid. Accordingly, it is important that a belt which is to be used in a corrosive fluid have a cover which is resistant to attack by the fluid and serves to isolate and shield the remaining portion of the belt enclosed therein.

SUMMARY

It is a feature of this invention to provide a simple and economical elastomeric endless power transmission belt which is capable of being used in a corrosive fluid environment for an extended service life.

Another feature of this invention is to provide an endless power transmission belt made primarily of elastomeric material and having a corrosion resistant cover made solely of elastomeric material. The cover when viewed in cross-section is defined by a U-shaped portion having a bight and a pair of legs extending from the opposite ends of the bight with the legs terminating in outer ends and a strip disposed between the outer ends. The U-shaped portion and strip are a unitary elastomeric mass which serves to isolate and shield the entire belt.

Accordingly, it is an object of this invention to provide an endless power transmission belt having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a perspective view with parts in cross-section and parts broken away illustrating one exemplary embodiment of the endless power transmission belt of this invention;

FIG. 2 is a view illustrating the exemplary belt of FIG. 1 being operated in a corrosive environment;

FIG. 3 is a cross-sectional view illustrating another exemplary embodiment of the belt of this invention; and FIG. 4 is a cross-sectional view illustrating another exemplary embodiment of the belt of this invention.

DESCRIPTION OF ILLUSTRATED EMBODIMENTS

Reference is now made to FIG. 1 of the drawing which illustrates an exemplary endless power transmission belt 10 of this invention which is made primarily of elastomeric material and which has a corrosion resistant cover which is designated generally by the reference numeral 11. The cover 11 is free of reinforcements and is made solely of elastomeric material and as will be described in detail subsequently.

As shown in FIG. 2, the belt 10 is particularly adapted to be operated in a corrosive environment shown as a corrosive liquid 12 which is contained in a suitable container 13. The belt 10 is operated around a pair of sheaves or pulleys 14 and 15 with the pulley 14 being suitably rotatably supported within the container 13 and being operatively connected by a shaft 16 to an agitating device (not shown) so that once the pulley 14 is rotated by the belt 10 the agitating device serves to agitate the liquid 12 and such liquid may be of the type utilized to clean metal articles prior to plating thereof, for example.

The pulley 15 is suitably supported at a position outwardly of the liquid 12 and is driven by a suitable motor 17 using a drive connection 18. The motor 17 rotates the pulley 15 which drives the belt 10, pulley 14, shaft 16, and the agitating device operatively connected thereto whereby the entire belt 10 is subjected to corrosive action by the liquid 12 as it moves in its endless path around the pulleys 14 and 15.

As seen in FIG. 1, the belt 10 has a compression section 20, a load-carrying section 21, and a tension section 22; and, these sections are protected by the previously mentioned corrosion resistant cover 11 which will now be described in detail.

The cover 11 when viewed in cross-section is defined by a U-shaped portion 23 and an outer flat strip 24 with the U-shaped portion 23 having a bight 25 defining the inside portion of the belt 10 and a pair of legs each designated by the same reference numeral 26 extending from opposite ends of the bight and defining the opposite sides of the belt 10 with the legs 26 terminating in outer ends 27. The strip 24 is disposed between the outer ends 27 and it will be seen that the strip 24 has a substantial thickness 30 and defines both the tension section 22 and that part of the cover 11 which defines the outer surface of the belt. The U-shaped portion 23 and the strip 24 are in the form of a single-piece unitary elastomeric mass as shown at two locations 31 at opposite ends of the strip 24. The cross hatching between portion 23 and strip 24 is shown in different directions at the two locations 31 yet without continuing the inside surfaces of the legs 26 above the load-carrying section and this has been done for ease of description and presentation and to emphasize the single-piece unitary character of the cover 11.

The U-shaped portion 23 and strip 24 and thus the cover 11 serves to isolate and shield the entire belt 10 against corrosive attack by the corrosive liquid 12; and, it will be appreciated that the cover 11 encapsulates the entire belt in a substantially seamless manner whereby liquid 12 is prevented from seeping into interior portions of the belt 10. The U-shaped portion 23 and strip 24 are made of the same elastomeric material; and, neoprene rubber has been used successfully to make such portions and hence cover 11 for belt 10 operated in corrosive cleaning liquid 12 used in cleaning metal parts prior to plating thereof.

The U-shaped portion 23 has a substantially uniform thickness throughout which is indicated at 32; and, as previously mentioned the strip 24 has a substantial thickness 30. The thickness 30 of the strip 24 is preferably substantially greater than the uniform thickness 32 of the U-shaped portion 23.

The load-carrying section 21 may be made in any suitable manner known in the art and in this example the load-carrying section 21 is comprised of a suitable helically wound load-carrying cord 33 which is embedded in the usual cushion material 34. The cord 33 may be made of any suitable material.

The compression section 20 of the exemplary belt 10 is comprised of a platform layer 35 and a layer 36 arranged between the platform layer 35 and the bight 25 of the U-shaped portion 23. The platform layer 35 is comprised of an elastomeric matrix material which has a plurality of discrete fibers a representative few of which have been designated by the reference numeral 37 embedded therein. The elastomeric material of the platform layer 35 serves as a matrix for the fibers 37 and such fibers are arranged in a predetermined pattern relative to a central longitudinal axis 38 of the belt; and, in this example the fibers 37 are disposed substantially perpendicular to the axis 38 and provide optimum transverse rigidity for the belt.

Other exemplary embodiments of the belt of this invention are illustrated in FIGS. 3 and 4 of the drawing. The belts of FIGS. 3 and 4 are similar to the belt 10; therefore, such belts will be designated by the reference numerals 10A and 10B respectively and representative parts of each belt 10A and 10B which are similar to corresponding parts of belt 10 will be designated in the drawing by the same reference numerals as in the belt 10 (whether or not such representative parts are mentioned in the specification) followed by the associated letter designation either A or B and not described again in detail. Only those component parts of the belts 10A and 10B which are different from corresponding parts of the belt 10 will be designated by new reference numerals also followed by an associated letter designation and described in detail.

The only difference between the belt 10A shown in FIG. 3 and the belt 10 is in the compression section 20A and it will be seen that the compression section 20A has a platform layer 35A which has a plurality of fabric layers each designated by the same reference numeral 40A with the fabric layers 40A providing the desired transverse rigidity for the belt 10A. The elastomeric layer 36A is also provided in the belt 10A and is disposed between the bight 25A and a closely adjacent fabric layer 40A.

As seen in FIG. 4, the belt 10B has a compression section 20B, a load-carrying section 21B, and a tension section 22B; and, these sections are protected by a corrosion resistant cover 11B which when viewing the belt 10A in cross-section has a U-shaped portion 23B and a flat strip 24B. The U-shaped portion 23B has a bight 25B which in this embodiment defines the outside portion of the belt 10B and a pair of legs each designated by the same reference numeral 26B extending from opposite ends of the bight and defining the opposite nonparallel sides of the trapezoidal belt 10B with the legs 26B terminating in outer ends 27B. The strip 24B is disposed between the outer ends 27B and the strip 24B also has a substantial thickness 30B and comprises the compression section 20B of the belt.

The compression section 20B of the belt 10B is also comprised of a platform layer 35B arranged between the load-carrying section 21B and the strip 24B. The platform layer 35B is comprised of an elastomeric matrix material which has a plurality of discrete fibers 37B embedded therein in a predetermined pattern relative to a central longitudinal axis of the belt 10B.

In a similar manner as described for the belt 10, the U-shaped portion 23B and the strip 24B are in the form of a single-piece unitary elastomeric mass as shown at two locations 31B at opposite ends of the strip 24B. As before, the cross hatching between portion 23B and strip 24B is shown in different directions at the two locations 31B yet without continuing the inside surfaces of the legs 26B beneath the platform layer 35B and this has been done for ease of description and presentation and to emphasize the single-piece unitary character of the cover 11B.

Each cover 11A and 11B of belt 10A and 10B respectively is also preferably made of the same elastomeric material such as neoprene rubber, for example, and each cover serves to isolate its entire belt against corrosive attack by a corrosive fluid such as liquid 12.

In the exemplary belts 10, 10A and 10B disclosed herein the associated strips 24, 24A, and 24B are disposed between the legs of their associated U-shaped portions and it will be seen that each of these strips has a substantially trapezoidal cross-sectional outline and as will be readily apparent from FIGS. 1, 3, and 4 of the drawing.

It will also be appreciated that the belts 10, 10A, and 10B having covers 11, 11A, and 11B respectively may be made utilizing any suitable technique known in the art.

The belt of this invention having a neoprene cover has been operated with a satisfactory service life in cleaning liquid such as liquid 12 which for various applications may contain sodium hydroxide, sodium cyanide, muriatic acid, sulphuric acid, or nitric acid depending on the article being cleaned.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt of trapezoidal cross section and made primarily of elastomeric material, said belt having a corrosion resistant cover made solely of elastomeric material, said cover when viewed in cross section being defined by a U-shaped portion having a bight and a pair of legs extending from opposite ends of said bight with said legs terminating in outer ends, and a strip disposed between said outer ends, said U-shaped portion and strip being a unitary elastomeric mass which serves to isolate and shield the entire belt.

2. A belt as set forth in claim 1 and having a tension section, a compression section, and a load-carrying section.

3. A belt as set forth in claim 2 in which said bight defines the inside portion of said belt and said strip has a substantial thickness and also defines said tension section of said belt.

4. A belt as set forth in claim 2 in which said bight defines the outside portion of said belt and said strip has a substantial thickness and comprises said compression section of said belt.

5. A belt as set forth in claim 2 in which said load-carrying section is comprised of a helically wound load-carrying cord.

6. A belt as set forth in claim 4 and further comprising a platform layer provided as a part of said compression section while being arranged inwardly of said strip, said platform layer providing transverse rigidity for said belt.

7. A belt as set forth in claim 2 and further comprising a platform layer provided as a part of said compression section, said platform layer providing transverse rigidity for said belt.

8. A belt as set forth in claim 7 in which said platform layer is comprised of an elastomeric matrix material having a plurality of discrete fibers embedded therein, said fibers being disposed in a predetermined pattern relative to a central longitudinal axis through said belt.

9. A belt as set forth in claim 8 in which said plurality of fibers are disposed substantially perpendicular to said central longitudinal axis.

10. A belt as set forth in claim 7 in which said platform layer is comprised of at least one fabric layer.

11. A belt as set forth in claim 7 in which said platform layer is comprised of a plurality of fabric layers and said compression section further comprises an elastomeric layer disposed between said bight and an adjoining fabric layer.

12. A belt as set forth in claim 3 in which said strip and U-shaped portion are made of the same elastomeric material.

13. An endless power transmission belt made primarily of elastomeric material and having a corrosion resistant cover which is free of reinforcement and made solely of a particular elastomeric material, said belt comprising, a compression section having a bottom layer, a load-carrying section, and a tension section, said cover when viewed in cross section being defined by a U-shaped portion and a strip, said U-shaped portion having a bight defining the outside portion of said belt and a pair of legs extending from said opposite ends of said bight and defining the opposite sides of said belt with said legs terminating in outer ends, said strip being disposed between said outer ends and defining said bottom layer and that part of said cover which defines the inside surface of said belt, said U-shaped portion and strip being a unitary elastomeric mass which serves to isolate and shield the entire belt.

14. A belt as set forth in claim 13 in which said particular elastomeric material is neoprene rubber.

15. A belt as set forth in claim 13 in which said U-shaped portion has a substantially uniform thickness throughout its bight and outwardly extending legs and said strip has a thickness which is greater than the uniform thickness of said U-shaped portion.

16. A belt as set forth in claim 15 in which said strip has a substantially trapezoidal cross-sectional outline.

17. An endless power transmission belt made primarily of elastomeric material and having a corrosion resistant cover which is free of reinforcement and made solely of a particular elastomeric material, said belt comprising, a compression section, a load-carrying section, and a tension section, said cover when viewed in cross section being defined by a U-shaped portion and an outer strip, said U-shaped portion having a bight defining the inside portion of said belt and a pair of legs extending from said opposite ends of said bight and defining the opposite sides of said belt with said legs terminating in outer ends, said strip being disposed between said outer ends and defining said tension section and that part of said cover which defines the outer surface of said belt, said U-shaped portion and strip being a unitary elastomeric mass which serves to isolate and shield the entire belt.

18. A belt as set forth in claim 17 in which said load-carrying section is comprised of a helically wound load-carrying cord.

19. A belt as set forth in claim 17 in which said compression section is comprised of a platform layer which provides transverse rigidity for said belt.

20. A belt as set forth in claim 19 in which said platform layer is comprised of an elastomeric matrix material having a plurality of discrete fibers embedded therein, said fibers being disposed in a predetermined pattern relative to a central longitudinal axis through said belt.

21. A belt as set forth in claim 19 in which said platform layer is comprised of at least one fabric layer.

22. A belt as set forth in claim 17 in which said sections an cover are made primarily of rubber.

* * * * *